(12) United States Patent
Eichler et al.

(10) Patent No.: US 7,311,263 B2
(45) Date of Patent: Dec. 25, 2007

(54) METHOD AND APPARATUS FOR HANDLING CARDS

(75) Inventors: Rudolf Eichler, Friedberg (DE); Martin Delles, Landsberg am Lech (DE)

(73) Assignee: Boewe Systec AG, Augsburg (DE)

( * ) Notice: Subject to any disclaimer, the term of this patent is extended or adjusted under 35 U.S.C. 154(b) by 309 days.

(21) Appl. No.: 11/004,144

(22) Filed: Dec. 3, 2004

(65) Prior Publication Data

US 2005/0082363 A1 Apr. 21, 2005

Related U.S. Application Data

(63) Continuation of application No. PCT/EP03/05861, filed on Jun. 4, 2003.

(30) Foreign Application Priority Data

Jun. 4, 2002 (DE) ................. 102 24 749

(51) Int. Cl.
*G06K 19/06* (2006.01)
(52) U.S. Cl. ..................... 235/492; 235/486
(58) Field of Classification Search ............... 235/492, 235/493, 486, 487, 380, 382, 382.5; 198/447, 198/434; 229/92.8, 92.1
See application file for complete search history.

(56) References Cited

U.S. PATENT DOCUMENTS

| | | | | |
|---|---|---|---|---|
| 4,034,210 A | * | 7/1977 | Hill et al. | 235/487 |
| 4,194,685 A | | 3/1980 | Hill et al. | 235/375 |
| 4,644,731 A | | 2/1987 | Zangheri | 53/411 |
| 5,388,815 A | * | 2/1995 | Hill et al. | 270/32 |
| 5,433,364 A | * | 7/1995 | Hill et al. | 225/96 |
| 5,494,544 A | * | 2/1996 | Hill et al. | 156/64 |
| 5,541,395 A | * | 7/1996 | Hill et al. | 235/462.13 |
| 5,651,445 A | * | 7/1997 | Stevens et al. | 198/447 |
| 5,923,015 A | * | 7/1999 | Hill et al. | 235/380 |
| 5,992,731 A | * | 11/1999 | Tani | 229/92.8 |
| 6,467,687 B1 | * | 10/2002 | Hill et al. | 235/448 |
| 7,036,723 B1 | * | 5/2006 | Hill et al. | 235/380 |
| 7,048,182 B2 | * | 5/2006 | Zettler | 235/380 |

FOREIGN PATENT DOCUMENTS

| | | |
|---|---|---|
| DE | 40 11 994 | 4/1990 |
| DE | 195 08 282 | 3/1995 |
| DE | 195 33 444 | 3/1995 |
| DE | 196 16 130 | 4/1996 |
| DE | 196 20 697 | 5/1996 |
| DE | 197 25 579 | 6/1997 |
| DE | 197 34 483 | 8/1997 |
| DE | 198 11 131 | 3/1998 |
| DE | 100 04 421 | 2/2000 |
| WO | WO94/21547 | 9/1994 |

\* cited by examiner

*Primary Examiner*—Thien M. Le
(74) *Attorney, Agent, or Firm*—Michael A. Glenn; Glenn Patent Group

(57) ABSTRACT

In an apparatus and a method for handling cards, wherein the cards comprise a memory element that may be read out in a contactless manner via a transponder, and pass through a plurality of handling stations, a card and a card carrier are initially brought together and joined. Subsequently, the card carrier is enveloped. Then a reading operation with regard to the card carrier which has been enveloped is performed so as to determine, on the basis of a signal received from the card carrier enveloped, whether a card is contained in the envelope.

36 Claims, 4 Drawing Sheets

METHOD AND APPARATUS FOR HANDLING CARDS

CROSS-REFERENCE TO RELATED APPLICATION

This application is a continuation of copending International Application No. PCT/EP2003/005861, filed Jun. 4, 2003, which designated Japan and the United States and was not published in English.

BACKGROUND OF THE INVENTION

1. Field of the Invention

The present invention relates to a method and an apparatus for handling cards, especially plastic cards, the plastic cards having a memory element from which data may be read out in a contactless manner via a transponder. In particular, the present invention relates to a method and an apparatus for handling such plastic cards which are mounted on card carriers associated with the respective plastic cards.

2. Description of Prior Art

In general, with prior art systems, plastic cards, such as thick plastic cards of the CR-80 type, may be automatically joined with (applied to) card carriers in a variable number of items. At an enveloping station, the card carriers provided with plastic cards are then packed in envelopes and are deposited in a shingled manner or are supplied to further processing, such as sorting or insertion into a letterbox system.

The prior art has known various methods and apparatus for applying plastic cards onto card carriers. From DE 195 08 282 C1 and from DE 195 33 444 A1, methods and apparatus are known for bringing together and joining plastic cards and card carriers using a print job number. Also according to the above documents, after the bringing together and joining, the card carriers are inserted into envelopes and subject to further processing. From DE 197 25 579 A1, a similar method is known, wherein the bringing together and joining of the plastic card and the card carrier is verified using a check sum. From DE 197 34 483 A1, a method and an apparatus for bringing together and joining plastic cards and card carriers using a print job number are known, the processing being effected off-line. The above-mentioned prior-art methods include joining card carriers and plastic cards, the plastic cards having a magnetic strip which may be read by a reader which establishes a contact between the plastic cards and the reader.

A disadvantage of the methods just described is that once the plastic card and the card carrier have been brought together and joined (applied), they are enveloped, i.e. the card carrier is enveloped, if need be after folding. Once the card carrier has been placed in the envelope, it is arranged therein such that the plastic card applied thereon is no longer visible from outside, so that after the card carrier has been enveloped, no more control may be performed as to whether or not the closed envelope contains a plastic card.

In addition, the prior art has known methods and apparatus, wherein objects are provided with a bar code detected with an optical reader while the objects are handled. By way of example, reference shall be made to DE 40 11 994 A1, DE 196 16 130 A1 and DE 196 20 697 A1. In this known method, a bar code is applied to an outer surface of an object in each case, so that same may be read by an optical reading device. Alternatively, the bar code is applied such that it is located within an envelope and may be read out through a window in the envelope.

The problems associated with the above-mentioned methods and apparatus for bringing together and joining plastic cards cannot be solved by these approaches, since after the plastic card has been enveloped, it is arranged in the envelope such that it is not visible from outside.

The above-described methods and apparatus further have the disadvantage that it is not possible to track the plastic card in the handling system. Even though an operator knows how many cards and which cards have been introduced into the system, but at the end/output of the system, a verification as to whether all plastic cards that have been introduced into the system have actually been removed from it may only be effected at high expense, if at all. During the operation, an operator is dependent on the reliability of the system used, since the operator has no possibility of tracking the plastic cards when they are processed in the system. This situation is disadvantageous, in particular when processing plastic cards which are sensitive in terms of security, e.g. credit cards etc., and enables an operator to meet the necessary security requirements only at high expense.

SUMMARY OF THE INVENTION

Thus, the present invention is based on the object of providing a method and an apparatus which allow tracking of a plastic card during processing.

In accordance with a first aspect, the invention provides a method of handling cards, the cards comprising a memory element that may be read out in a contactless manner via a transponder, and passing through a plurality of handling stations, the method including the following steps:

(a) bringing together and joining a card and a card carrier;
(b) inserting the card carrier into an envelope; and
(c) performing a reading operation with regard to the card carrier enveloped in step (b) so as to determine, on the basis of a signal received from the card carrier enveloped, whether a card is contained in the envelope.

In accordance with a second aspect, the invention provides an apparatus for handling cards with a plurality of handling stations that the cards pass through, the cards comprising a memory element which may be read out in a contactless manner via a transponder, the apparatus having:

an applicator for bringing together, joining and outputting a card and a card carrier;
an inserter for inserting the card carrier into an envelope;
a reader for performing a reading operation with regard to the card carrier enveloped; and
a controller determining, on the basis of a signal received from the card carrier enveloped, whether a card is contained in the envelope.

Preferably, the card is a plastic card.

Insertion into an envelope includes inserting the card carrier into an envelope or folding the card carrier and sealing same at its edges. The envelope is a windowless envelope that has been provided with information required for shipment or will be provided with this information after the insertion of the plastic card. Alternatively, the envelope has a window.

In accordance with a preferred embodiment of the present invention, only the presence or absence of a plastic card in the envelope is determined, and irrespective of the result of the reading operation a signal is generated which indicates that information has been received from the plastic card or not, so that a further control may be effected in dependence on the signal, which causes the envelope to be either passed on to a further station for further handling of same, if the reading operation has revealed that information has been received from the memory element. Alternatively, if no information has been received by the reader, the envelope is removed from the further handling process.

In accordance with another preferred embodiment of the present invention, a qualitative check is performed in addition to the quantitative check, i.e. the check as to whether the card is there or not. In this embodiment, predetermined information, such as address information, is read from the card and compared to corresponding information associated with the card carrier. The information associated with the card carrier may be obtained, for example, by an OCR read (OCR=optical character recognition) of the printed envelope or the printed card carrier through the envelope window. By this OCR read, the address information associated with the card carrier is read out. Alternatively, the data contained in the overall system may be read out from, e.g., a database so as to compare the information associated with the respective card carrier with the card data obtained by the reader.

In accordance with a further embodiment of the present invention, the reader additionally detects which plastic cards have been inserted into envelopes, and on the basis of this information, a corresponding report is created so as to document which cards have already been inserted into envelopes and which ones have not.

The plastic cards used in accordance with the invention include an integrated antenna and a card chip. The reader is configured to address these cards, and induces an alternating field which creates a voltage, via the antenna integrated in the card, for supplying the card chip. Hereby, an exchange of data may be effected between the reader and the card chip across a certain frequency range.

The advantage of the present invention is that it provides the possibility, for the first time, of detecting even after card carrier has been enveloped whether a plastic card is contained in the envelope.

A further advantage of the present invention is that in addition to the reader downstream of the enveloping means, other reader may be provided at other stations of the system so as to track the plastic card during the entire process, so that the plastic card's path may be tracked, in a reliable manner, from entering the system right up to exiting same.

In accordance with the invention, the security in handling the plastic cards may even be increased as compared with prior-art systems, since now, a repeated check is performed at the end of the system as to whether a plastic card is actually contained in the envelope. If need be, a further check may be made as to whether the plastic card contained actually belongs to the respective card carrier with which it was enveloped. This again ensures that no cards are sent out to unauthorized third parties, so that the security of handling the card is increased once more. In addition, it may now be set forth in detail which cards have been introduced into the system and which cards have been extended from the system, so that the loss of one or several cards in the system may be detected in a reliable manner.

BRIEF DESCRIPTION OF THE DRAWINGS

Preferred embodiments of the present invention will be explained below in more detail with reference to the accompanying figures, wherein.

DESCRIPTION OF PREFERRED EMBODIMENTS

Figure 1:
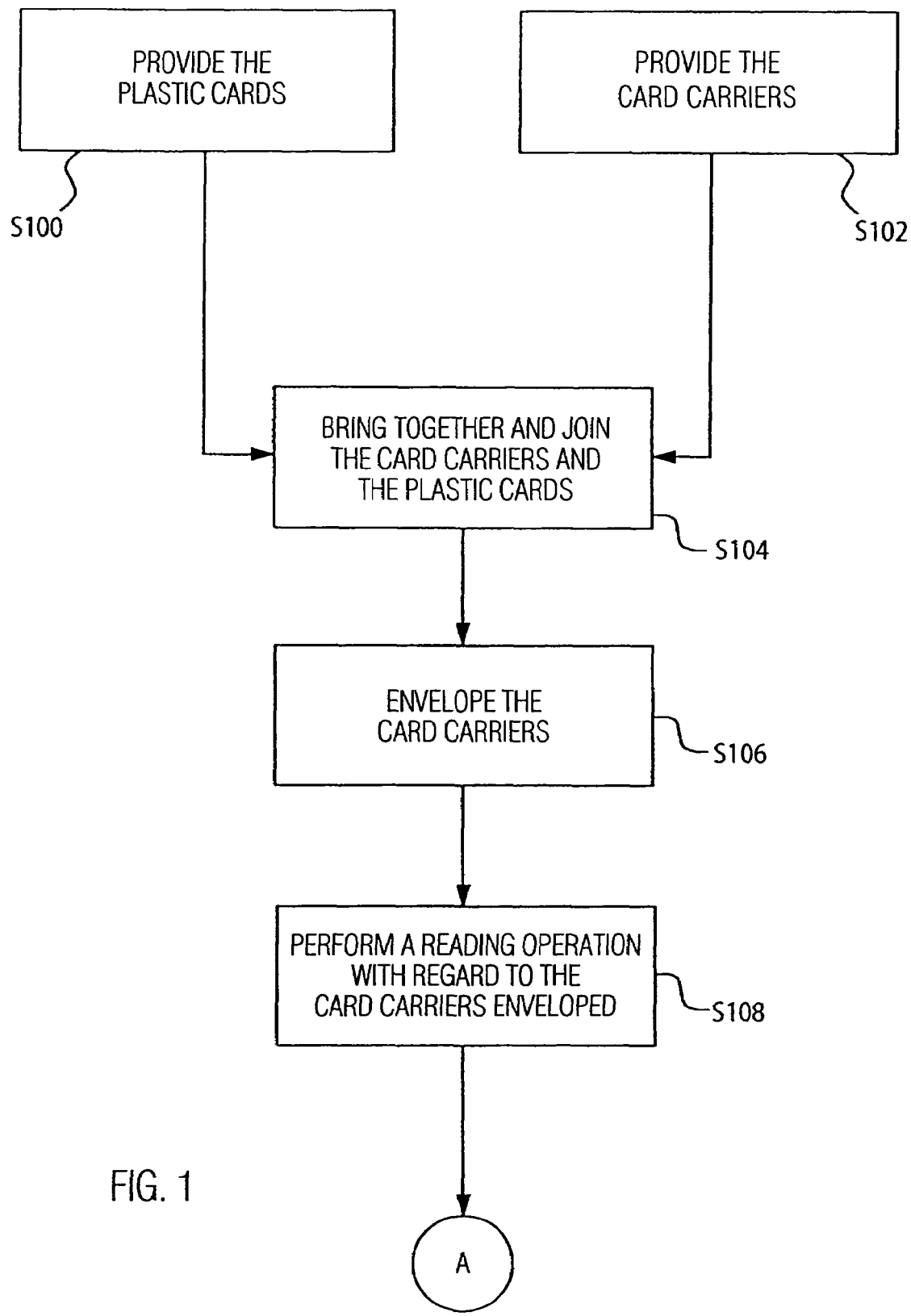
FIG. 1 shows a first part of the inventive method.

A first part of the inventive method will now be explained in more detail with reference to FIG. 1. In a first step S100, the plastic cards to be processed by a respective system are initially provided. The plastic cards include a memory element, e.g. in the form of a card chip, the memory element being able to be read out in a contactless manner via a transponder. To this effect, a specific reader is provided which addresses the cards and induces an alternating field in an antenna integrated in the card so as to create a voltage for supplying the card chip. This enables the exchange of data between the reader and the card chip in a certain frequency range.

A further step S102 includes providing the card carriers to which the plastic cards provided in step S100 are to be applied. The card carriers are typically letters to the holders of the plastic cards with which the new plastic cards are sent out to the holders. For this purpose, the card carriers contain respective address fields so as to enable the card carrier with the plastic cards, enveloped, to be sent by post.

It has to be stated with regard to the inventive method that same is suitable both for on-line operation and for off-line operation of a card-handling system. In on-line operation, the card carriers are created by the handling system itself, e.g. are provided with the necessary data, which are provided by a database of the system, by a laser printer and are subsequently fed to the applicator. In off-line operation, the card carriers are printed and personalized in advance and subsequently provided, in a predetermined sequence, to the system for handling. In on-line operation, the plastic cards are supplied to the system, and on the basis of the information that may be obtained from the plastic cards, a database may be accessed so as to effect a respective creation of a card carrier by the laser printer. In off-line operation, the cards as well as the card carriers are provided to the system in a corresponding, presorted form. The modes of operation just described are described in more detail in DE 195 08 282 C1, DE 195 33 444 A1, DE 197 25 579 A1 and DE 197 34 483 A1.

In a subsequent step S104, the plastic cards and the card carriers are brought together and joined (applied), wherein prior to applying a plastic card and a card carrier both objects are matched in the manner which has been described in detail in the above-mentioned documents. Depending on the number of cards to be sent to a card holder, one or several plastic cards may be applied to one card carrier.

After the application, step S106 includes inserting the card carriers into envelopes, and the card carriers inserted into envelopes are subsequently fed to a reader, so that a reading operation with regard to the card carriers enveloped is performed in step S108. Depending on the result of this reading operation it may be seen whether or not the envelope contains a plastic card.

Figure 2:
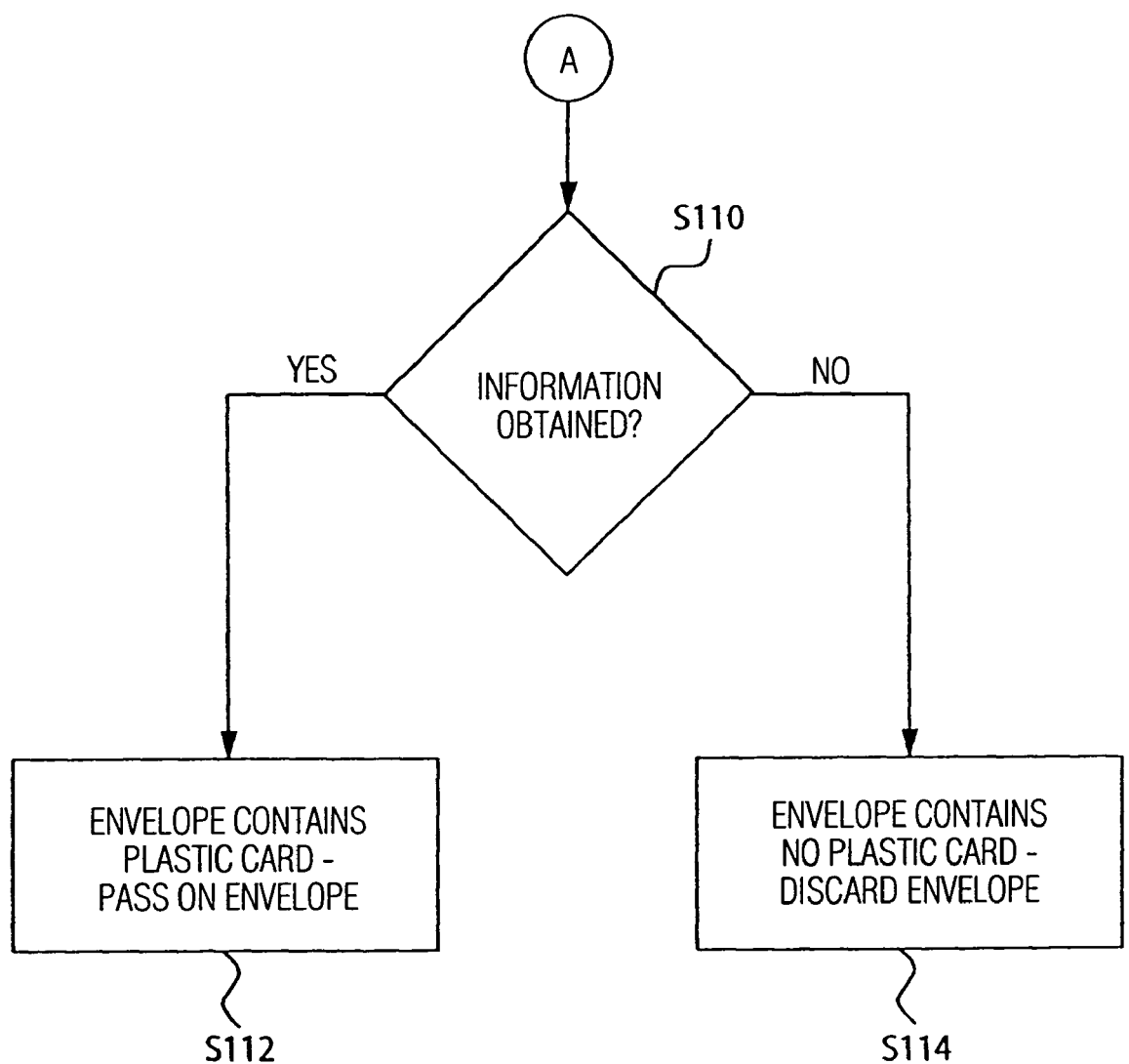
FIG. 2 shows a second part of the inventive method in accordance with a first embodiment.

A first embodiment of the present invention will be explained in more detail with reference to FIG. 2. After performing the reading operation in step S108, a query is made in step S110 as to whether information has been obtained by the reading operation.

If this is so, a determination is made in step S112 that the envelope contains a plastic card, and the envelope is passed on for further processing in the system. If it is found, in step S110, that no information has been obtained, it is established, in step S114, that no plastic card is contained in the envelope, and the envelope is discarded from the system or the handling process.

With regard to the check performed in step S110 as to whether information has been obtained, it is to be noted that this includes several possibilities. The simplest possibility is to simply check whether any information (signals) has been obtained from the envelope so as to determine, in the event that the information exists, that a card is contained in the envelope, and to determine, in the event that no information exists, that no card is contained therein.

Instead of the simple poll as to whether any information has been obtained at all, provision may be made, alternatively, for predetermined information to be read from the card, which information must then be received by the reader so as to evaluate the existence or non-existence of a plastic card. If this information is not obtained or if data is obtained which does not correspond to this information, it may be concluded from this that either there is no plastic card in the envelope or that there is a defective plastic card contained in the envelope, which then is to be discarded as well. The information to be read out may include, for example, an identification mark stored in the plastic card. If same is used, there is the possibility, in addition to reading out the information and to determining whether a plastic card is contained or not, of storing the information thus read in a memory and to generate a report reflecting which plastic cards have been processed in the system.

Figure 3:
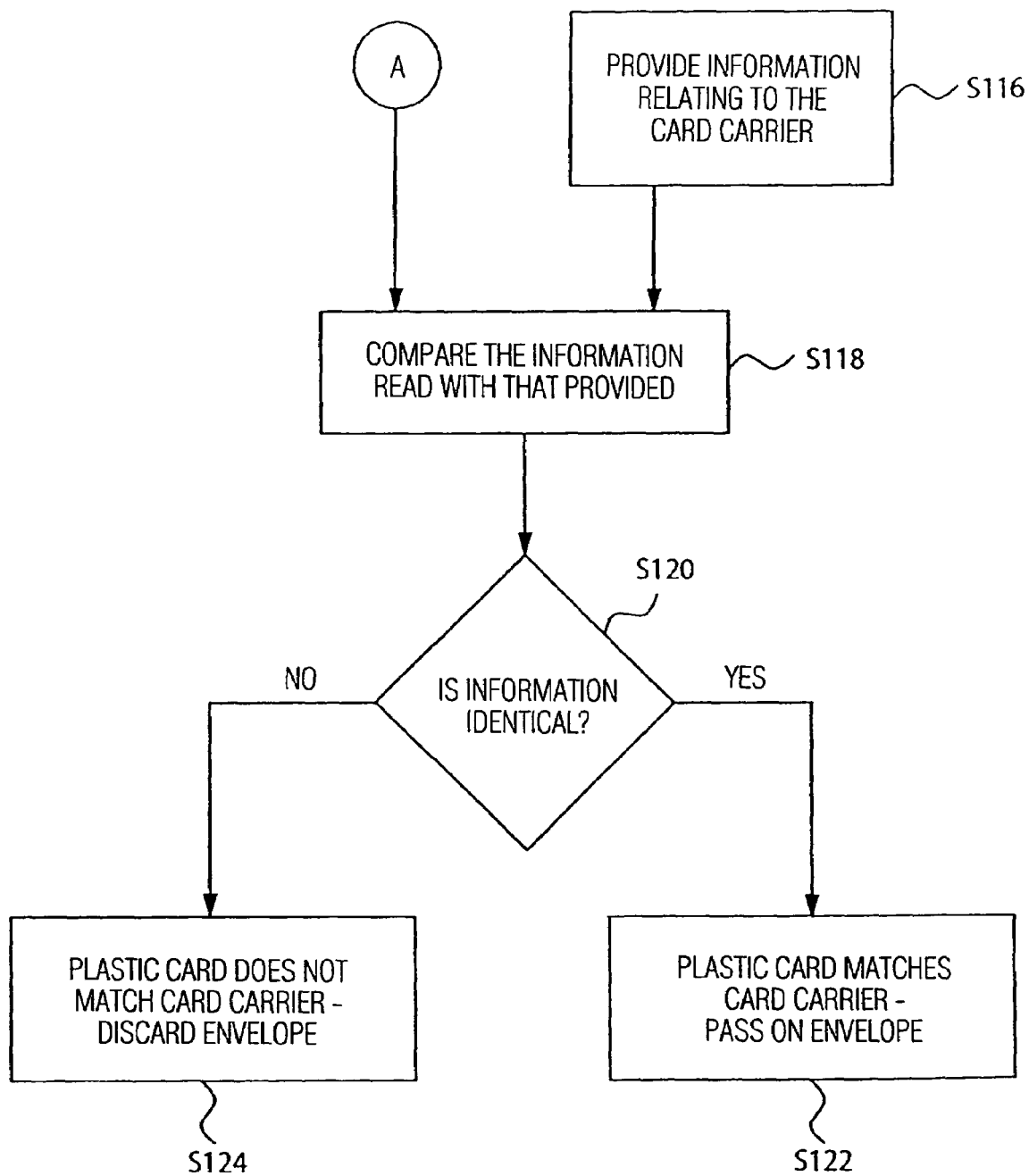
FIG. 3 shows a second part of the inventive method in accordance with a second embodiment.

A second embodiment of the present method will be explained below in more detail reference to FIG. 3. In addition to performing a reading operation in step S110, further information is provided in step S116, which, however, relates to the card carrier this time. This information may be, e.g., address information obtained from the card carrier by means of an OCR read. Once the card carrier has been inserted in the envelope, the OCR read is effected through the envelope window. Alternatively, the data relating to the card carrier may be provided by the system, for example from the database of same, in this case there being a need to ensure that the system "knows" which card carrier has just been enveloped.

In a step S118, the data obtained by the reading operation in step S108 and the data provided in step S116 are compared with each other. In step S120, a determination is made, on the basis of the comparison in step S118, as to whether the information is identical or not. If the information is identical, it is stated, in step S122, that the plastic card and the card carrier match, and the envelope containing them is passed on for further processing. If it is found, in step S120, that the information is not identical, it is stated, in a subsequent step S124, that the plastic card and the card carrier do not match, and the envelope containing this combination is discarded from the system.

In a manner similar to the first embodiment described above with reference to FIG. 2, in addition to discarding non-matching pairs of plastic cards and card carriers, defective plastic cards may also be discarded, the defectiveness of the plastic cards being detected in that data which is reproduced in a defective manner would also lead to a negative comparison with the data from the card carrier.

In the above-described embodiments, the reader performing the reading step S108 preferably creates different signals indicating whether or not information has been obtained. In the first embodiment, a determination is made in step S110 on the basis of these signals as to whether or not a signal has been emitted by the plastic card in the envelope.

It is also possible, in the above-described embodiments of the inventive method, to perform further reading operations so as to monitor the processing of a plastic card during the overall process. To this effect, a respective reading step may be included after step S100, for example, so as to determine which plastic cards are entering the system.

Figure 4:
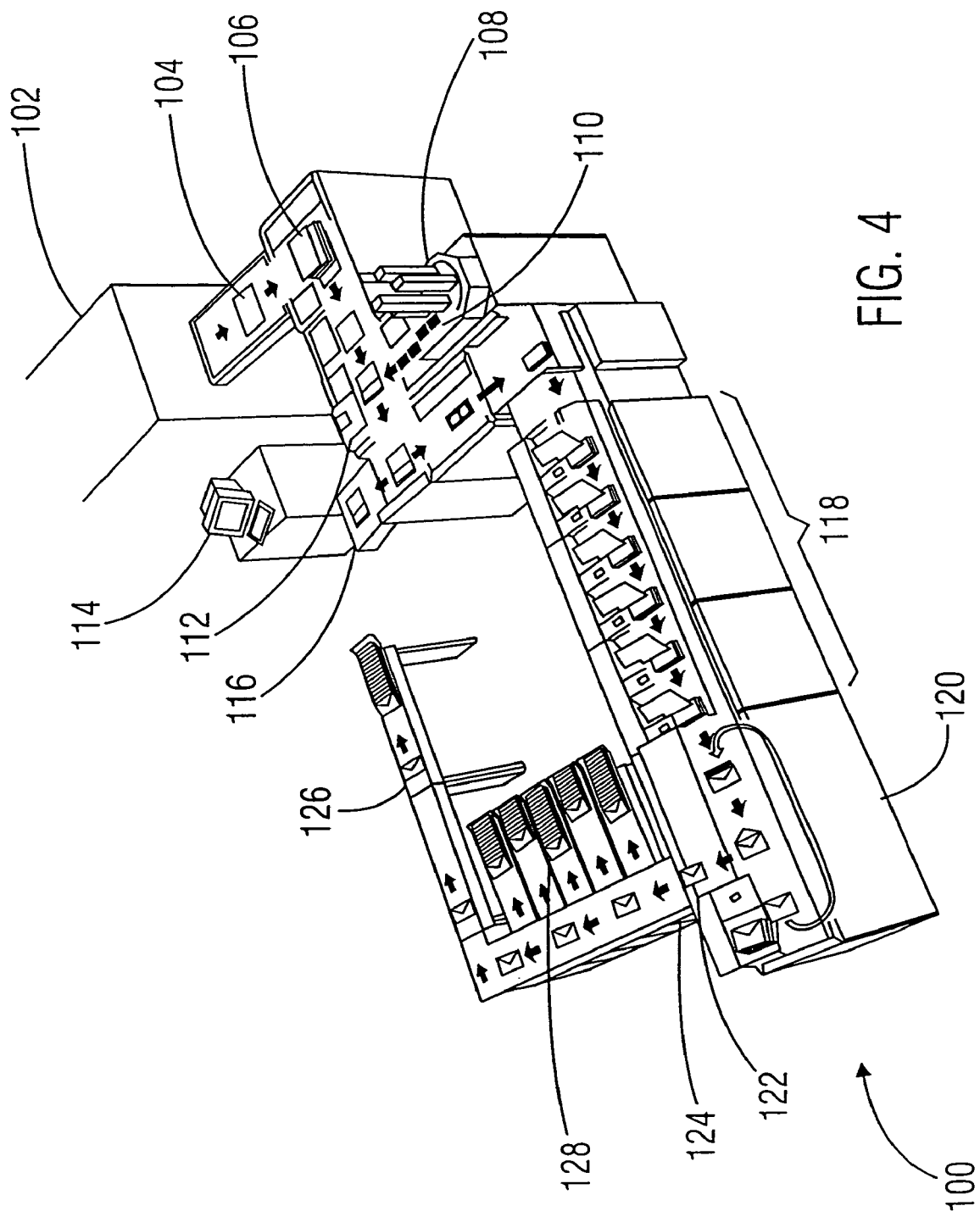
FIG. 4 shows an embodiment of the inventive apparatus.

An embodiment of an inventive apparatus will be explained below in more detail with reference to FIG. 4. FIG. 4 shows a system 100, by means of which plastic cards are applied to card carriers, inserted into envelopes and are provided for shipment. The embodiment shown in FIG. 4 is an on-line system, i.e. a system which personalizes the card carriers by itself.

System 100 includes a printer 102, e.g. a laser printer, which is shown in a diagrammatic manner. The laser printer 102 outputs printed card carriers 104 to a buffer hopper 106. Hopper 106 may contain a predetermined number of preprinted card carriers 104, the laser printer feeding the card carriers 104 to an upper side of the hopper 106, and card carriers being withdrawn, for further processing, from a lower side of hopper 106. This enables decoupling of the processing speeds of laser printer 102 and of the downstream stations of system 100. In addition, system 100 includes several card towers 108, wherein the plastic cards are held. From card towers 108, the plastic cards 110 are moved in the direction of an applicator 112, to which the card carriers 104, which have been removed from hopper 106, are moved as well. In applicator 112 the plastic cards 110 are joined with the carriers 104, one or several plastic cards being applied to one carrier depending on the number of cards to be sent. The cards are affixed to the carrier by means of, e.g., adhesive labels.

Depending on the configuration of system 100, a reader (not shown) may be provided between card towers 108 and applicator 112, the reader reading information from the plastic card (in a contactless manner). On the basis of the information detected, a database 114 is accessed so as to pass on, from there to printer 102, the print data for printing the card carriers 104.

Alternatively, the additional reader between towers 108 and applicator 112 may be dispensed with if the plastic cards are provided in a sequence corresponding to a sequence in which the card carriers are produced by printer 102 and the control of database 114.

With system 100, provision may be additionally made for performing the match of cards and card carriers brought together, prior to applying in the applicator 112, in one of the manners described in the above-mentioned documents of the prior art. If the elements are found not to match, they are removed to an ejection station 116 downstream of applicator 112. Matching cards and card carriers are moved in the direction of the supplement feeders 118, the card carriers being folded on their way to the supplement feeders.

At the supplement feeders 118, further supplements are optionally added to the card carrier before the latter is fed to an enveloping means 120, wherein the card carrier, as the case may be with the further supplements, is enveloped. The envelopes 122 which have been filled are removed from the enveloping means 120 and fed to a reader 124 which addresses the plastic card to read out information from it.

Depending on the results of the reading operation performed by reader 124, the control of system 100 in accordance with the above-described preferred embodiments of the present application is effective to either discard an envelope 124 or to subject it to further processing. If envelope 124 is found to contain no or a defective plastic card, this envelope is discarded and stored on a respective tray 126. If the envelope is found to contain plastic cards or if the plastic cards match the card carrier, the respective envelope is stored in respective trays 128, depending on the destination to which it is to be sent.

With regard to the exemplary system described with reference to FIG. 4, it shall be pointed out that this is merely a preferred embodiment and that the inventive method and the inventive apparatus may also be implemented differently. In particular, the invention is not limited to a system operating on-line, but is also applicable to systems operating off-line. In addition, the present invention is not limited to the system configuration shown in FIG. 4, but other system components may be provided, or some of the system components, such as the supplement feeders, may be provided in a reduced number or may not be provided at all.

In addition to the reader 124, further reader may be provided so as to monitor a plastic card while it passes through system 100. For example, a reader may be provided at the output of the card towers 108 so as to detect a plastic card entering the system 100. In addition, a respective reader may be provided upstream of the ejection station 116 so as to detect when a plastic card is discarded from the system because it does not match the card carrier.

Those skilled in the art will readily appreciate that, in another location, further reader may be provided for detecting the plastic card at a respective position of system 100.

Even though the preferred embodiments have primarily been described with reference to systems which have inserted only one plastic card into an envelope, it is obvious that the inventive concept may also be applied to several plastic cards associated with one carrier. In this case, information is obtained from the plurality of card carriers when reading same so as to establish how may and, as the case may be, which plastic cards are present.

The above embodiments have been described with reference to envelopes having windows through which the address information on the card carrier is visible. Alternatively, a closed envelope (without a window), which has the address information printed on it, may also be used. In another embodiment, insertion into an envelope includes folding the card carrier and sealing same at its edges, so that the folded card carrier by itself already forms the packet to be shipped.

In a further embodiment, provision may be made for initially using unprinted envelopes instead of the envelopes (without windows) already imprinted. After insertion into an envelope, the envelope or the folded and sealed card carrier is imprinted with information which has been obtained on the basis of information read out from the plastic card. In this case, the reader is provided for reading predetermined information from the memory element of the plastic card, which information is then printed by means of a printer. The information provided for printing may include, for example the address information required for sending the card carrier, but may also include other information, as the case may be, in addition to the address information that has already been printed, information associated with the receiver or predetermined advertising information. The information may be stored on the plastic card, or may include, alternatively, an identification mark of the plastic card with which a database, in which the information is stored, is accessed.

The present invention is not limited to the above-described embodiments with regard to reading plastic cards inserted into envelopes. In fact, in its broadest implementation, the present invention enables tracking plastic cards in a handling system for plastic cards as has been described, e.g., with reference to FIG. 4. The reader which have already been described there may be used, in addition to the described functions, to detect and protocol the position of a plastic card in the system, so that the passage of the plastic card through the system is detected by the protocol. Alternatively or additionally, further reader may be provided at or between the handling stations (ejection station 116, supplement feeder 118, enveloping means 120, trays 126, 128—see FIG. 4). It is obvious for those skilled in the art that on the basis of the specific configuration of the system, other or additional handling apparatus may be provided, at or between which there may also be provided reader for performing a reading operation with regard to a plastic card.

In an alternative embodiment, inserting the card carriers into envelopes with the plastic cards may be dispensed with. In this case a plastic card and a card carrier are only brought together and joined and are subsequently, as the case may be, after passing through further handling stations, output without insertion into envelopes. This may be desirable if the plastic card and the card carrier are sent to intermediaries only.

One of the additional handling stations that may be provided, as the case may be, may include, e.g., a folding unit.

Even though preferred embodiments of the present invention have been described using the example of a plastic card and a card carrier, it is to be noted that the present invention is not limited thereto. Rather, the present invention may generally be applied to bringing together and joining cards and card carriers.

As far as the present invention relates to cards, the term "card" is preferably to be understood to relate to a plastic card (e.g. CR-80) as is used today, e.g., with credit cards or the like. However, the present invention is not limited to such plastic cards. In fact, any cards may be handled, the term "card", as used in the present invention, not only meaning plastic cards but also other cards or card-like elements or data carriers, e.g. mini-discs or mini-CDs, SIMM cards, presents or other extras that are to be processed with a letter and are to be jointly sent to a recipient. In a preferred embodiment, the plastic cards are sent by post and include, among other things, credit cards, medical insurance cards, driving licenses and identity cards, loyalty cards, such as Miles & More, etc.

In addition to the cards, the envelope or the card carrier may also comprise a tray medium that may be read out through a transponder. This allows reading out the tray media of the envelope or the card carrier and the card prior to inserting the card into the envelope or prior to applying the card onto the card carrier, so as to determine whether the envelope or the card carrier and the card belong together.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method of handling cards, the cards comprising a memory element that may be read out in a contactless manner via a transponder, and passing through a plurality of handling stations, the method comprising:
   (a) bringing together and joining a card and a card carrier;
   (b) inserting the card carrier into an envelope; and
   (c) performing a reading operation with regard to the card carrier enveloped in step (b) so as to determine, on the basis of a signal received from the card carrier enveloped, whether a card is contained in the envelope.

2. The method as claimed in claim 1, wherein step (b) includes introducing the card carrier into an envelope.

3. The method as claimed in claim 2, wherein the envelope comprises a window.

4. The method as claimed in claim 2, wherein the envelope comprises a memory element that may be read out by a transponder.

5. The method as claimed in claim 1, wherein step (b) includes folding the card carrier and sealing same at its edges.

6. The method as claimed in claim 5, wherein the card carrier comprises a memory element that may be read out by a transponder.

7. The method as claimed in claim 1, wherein a first signal is generated in step (c) when a piece of information is read out from the card by the reading operation, and wherein a second signal is generated in step (c) when no information is read out from the card by the reading operation, the method further comprising:
   (d) if the first signal is generated in step (c), passing on the enveloped card carrier to a subsequent station for handling same; and
   (e) if the second signal is generated in step (c), removing the enveloped card carrier from the handling process.

8. The method as claimed in claim 1, wherein in step (c), predetermined information is read from the memory element, the method further comprising:
   (d) comparing the information read out in step (c) with corresponding information associated with the card carrier;
   (e) if the information compared in step (d) matches, passing on the enveloped card carrier to a subsequent station for handling same; and
   (f) if the information compared in step (d) does not match, removing the enveloped card carrier from the handling process.

9. The method as claimed in claim 8, wherein the information associated with the card carrier is detected from the envelope or from the card carrier.

10. The method as claimed in claim 9, wherein, by means of optical detection, the information is detected from the envelope or from the card carrier through the window in the envelope.

11. The method as claimed in claim 10, wherein the information to be compared includes address information detected by an OCR read.

12. The method as claimed in claim 8, wherein the information relating to the card carrier is obtained from a database.

13. The method as claimed in claim 1, wherein additional information is stored which indicates which cards have been inserted into envelopes.

14. The method as claimed in claim 13, wherein a report about the cards which have been inserted into envelopes is created on the basis of the additional information.

15. The method as claimed in claim 1, wherein in step (c), predetermined information is additionally read from the memory element, the method further comprising:
   providing the information read, and
   printing the information provided onto the envelope or onto the card carrier which has been folded and sealed.

16. The method as claimed in claim 15, wherein the information provided includes the address information required for shipment, other information associated with the recipient, or predetermined advertising information.

17. The method as claimed in claim 15, wherein the information provided is stored on the card, or wherein the predetermined information includes an identification mark of the card with which a database, wherein the information is stored, is accessed.

18. The method as claimed in claim 1, wherein the card is a plastic card.

19. An apparatus for handling cards with a plurality of handling stations that the cards pass through, the cards comprising a memory element which may be read out in a contactless manner via a transponder, the apparatus comprising:
   an applicator for bringing together, joining and outputting a card and a card carrier;
   an inserter for inserting the card carrier into an envelope;
   a reader for performing a reading operation with regard to the card carrier enveloped; and
   a controller determining, on the basis of a signal received from the card carrier enveloped, whether a card is contained in the envelope.

20. The apparatus as claimed in claim 19, wherein the inserter includes an enveloping means for introducing the card carrier into an envelope.

21. The apparatus as claimed in claim 20, wherein the envelope comprises a window.

22. The apparatus as claimed in claim 20, wherein the envelope comprises a memory element that may be read out by a transponder.

23. The apparatus as claimed in claim 19, wherein the inserter includes a folder and a sealer for folding the card carrier and sealing same at its edges.

24. The apparatus as claimed in claim 23, wherein the card carrier comprises a memory element that may be read out by a transponder.

25. The apparatus as claimed in claim 19, wherein the controller generates a first signal when the reader receives a piece of information from the card and wherein the controller generates a second signal when the reader receives no information from the card,
   the controller passing on the card carrier enveloped to a subsequent station for handling same in response to the first signal; and
   the controller removing the card carrier enveloped from the handling process in response to the second signal.

26. The apparatus as claimed in claim 19, wherein the reader reads predetermined information from the memory element, the controller being operative to
   compare the information read out with corresponding information associated with the card carrier;
   pass on the card carrier enveloped to a subsequent station for handling same if the information compared matches; and
   remove the card carrier enveloped from the handling process if the information compared does not match.

27. The apparatus as claimed in claim 26 comprising a detector for detecting the information associated with the card carrier from the envelope or the card carrier.

28. The apparatus as claimed in claim 27, wherein the detector is an optical detector reading the information from the envelope or from the card carrier through the window in the envelope.

29. The apparatus as claimed in claim 28, wherein the information to be compared includes address information, the optical detector being an OCR reader.

30. The apparatus as claimed in claim 27 with a database containing the information relating to the card carrier.

31. The apparatus as claimed in claim 19, wherein the controller additionally stores information which indicates which cards have been inserted into envelopes.

32. The apparatus as claimed in claim 31, wherein the controller generates a report about the cards inserted into envelopes on the basis of the additional information.

33. The apparatus as claimed in claim 19, wherein the reader further reads predetermined information from the memory element, the apparatus further including a printer for printing information on the envelope or the card carrier which have been folded and sealed.

34. The apparatus as claimed in claim 33, wherein the information provided includes the address information required for shipment, other information associated with the recipient, or predetermined advertising information.

35. The apparatus as claimed in claim 33, wherein the information provided is stored on the card, or wherein the predetermined information includes an identification mark of the card with which a database, wherein the information is stored, is accessed.

36. The apparatus as claimed in claim 19, wherein the card is a plastic card.

* * * * *